US006859784B1

(12) United States Patent
van Duyne et al.

(10) Patent No.: US 6,859,784 B1
(45) Date of Patent: Feb. 22, 2005

(54) AUTOMATED RESEARCH TOOL

(75) Inventors: Douglas King van Duyne, Los Gatos, CA (US); James Anthony Landay, Oakland, CA (US); Mark Newman, Oakland, CA (US)

(73) Assignee: Keynote Systems, Inc., San Mateo, CA (US)

( * ) Notice: Subject to any disclaimer, the term of this patent is extended or adjusted under 35 U.S.C. 154(b) by 0 days.

(21) Appl. No.: 09/407,802

(22) Filed: Sep. 28, 1999

(51) Int. Cl.[7] .............................................. G06F 17/60
(52) U.S. Cl. .......................... 705/10; 463/17; 463/40
(58) Field of Search .............................. 705/10, 17, 40

(56) References Cited

U.S. PATENT DOCUMENTS

| | | | | |
|---|---|---|---|---|
| 4,845,739 A | * | 7/1989 | Katz ............................ | 379/92 |
| 5,335,342 A | * | 8/1994 | Pope et al. .................... | 714/38 |
| 5,615,123 A | * | 3/1997 | Davidson et al. ........... | 700/233 |
| 5,761,648 A | * | 6/1998 | Golden et al. ................ | 705/14 |
| 5,968,125 A | * | 10/1999 | Garrick et al. .............. | 709/224 |
| 6,014,634 A | * | 1/2000 | Scroggie et al. .............. | 705/14 |
| 6,189,029 B1 | * | 2/2001 | Fuerst ......................... | 709/217 |
| 6,360,235 B1 | * | 3/2002 | Tilt et al. ................. | 715/501.1 |

FOREIGN PATENT DOCUMENTS

GB 2386218 * 10/2003 ........... G06F/17/27

OTHER PUBLICATIONS

Kassaye, W Wossen. "The effect of the World Wide Web on agency–advertising relationships: towards a strategic framework." May, 1997;International Journal of Advertising; v16, n2, p. 85. [DIALOG].*

Ballator, Nada. "The NEAP Guide." Oct. 1996. Retrieved online (Jan. 30, 2003).*

* cited by examiner

*Primary Examiner*—James P. Trammell
*Assistant Examiner*—James A. Reagan
(74) *Attorney, Agent, or Firm*—Fish & Richardson P.C.

(57) ABSTRACT

A method and apparatus for automatically gathering research data for a website. The method includes forming questions in a question set that are a measure of a research metric to be gathered for the website, partitioning the question set into a plurality of subsets of questions, identifying participants to query, and only presenting a subset of questions from the question set to each participant. Responses are gathered from each participant to the questions presented for the research metric and the participants' responses are combined to produce an index of the research metric.

32 Claims, 14 Drawing Sheets

NetRaker
Intelligence Center
my home > NetRaker Intelligence Center

Overview — 600

Team List [Edit] ⊗
IC Administrator
Douglas van Duyne

Team Member
dana@liliesofdesign.com
landay@cs.berkley.edu
svilaysom@yahoo.com
corinne zanetti@yahoo.com
namwenkram@yahoo.com
Bob Ngu
raghu yeluri eMail all Team Members netRaker™ [Help][Support][Sign-out]

Edit IC ⊗

Research Module — 602
>Start New Research
To begin a marketing or usability research project, click the Start New button to the right. A setup wizard will take you through the steps of creating and new project.

Actions:
Start New — 610

Usability test of prelim Request Tracker 1999
Project Leader:
11 Invited, Max Participants: 9, 11, No NDA, No Reward

Status: Stopped

Actions: — 606
Dry Run
Review Results — 608

Usability test #2 of Request Tracker
Project Leader:
No NDA, No Reward

Status: Started

Actions:
Dry Run
Stop

Customize this Page - Add sections to the Intelligence Center!
--add left side content -- ▶ [Add Left]
--add right side content -- ▶ [Add Right]

Perfecting the Web Experience ™

Intelligence Center Setup ⇒ | 1. Account ✓ | 2. Site | 3. Invite

Site Name ☐ (required)

Instructions

Content Type

Usage Type

Use this screen to create your Intelligence Center. Filling in the requested information about your site will allow NetRaker to help you gather information tailored to your site.

Education
- ☐ College and University
- ☐ College Entrance
- ☐ K-12

Government
- ☐ Federal Government
- ☐ State &Local Government
- ☐ Taxes

Computers and Internet
- ☐ Internet Directories and Search Engines
- ☐ Computer Games
- ☐ Software Downloads
- ☐ Magazines
- ☐ Newsgroups
- ☐ Personalized Web Pages
- ☐ Product Reviews
- ☐ Web Development

News and Media
- ☐ Internet Broadcasts
- ☐ Magazines
- ☐ News
- ☐ Radio
- ☐ Television Networks
- ☐ Weather

- ☐ Browse for Info
- ☐ Search for Info
- ☐ Buy Item
- ☐ Customization
- ☐ Read News
- ☐ Bid on Item/Sell Item (in an online auction)
- ☐ Use Service
- ☐ Chat/Collaborate
- ☐ Perform Transactions
- ☐ Play Game
- ☐ Download Software
- ☐ Audio/Video
- ☐ None of the Above

FIG._6B

Sports and Recreation
- Participatory
- Spectator
- Magazines
- News
- Outdoor Recreation

Health
- Fitness
- Elders

Product Information
- Product Reviews

Arts and Entertainment
- Comedy
- History
- Internet Broadcasts
- Literature
- News/Magazines
- Movies and Film
- Music
- Popular Culture
- Rock and Pop Music
- Science Fiction

Business and Finance
- Business Directories
- Careers and Jobs
- News/Magazines
- Personal Investing
- Real Estate
- Taxes
- City Guides
- Classifieds and Auctions

Home and Family
- Automotive
- Food and Drink
- Parenting
- Pets

Reference
- Business Directories
- Dictionaries
- Do-it-Yourself
- FAQs
- Libraries
- People Finders
- Quotations
- Yellow Pages
- Internet Directories and Search Engines

Science
- Education

Services
- Banking
- Investing
- Shipping
- Personal Information Management

Shopping
- Online Malls
- Product Reviews
- Comparison Shopping

Society and Culture
- College Students
- Dating
- Families
- Kids
- Parenting
- Elders
- Women
- Men
- Teens

FIG._6C

Travel
    ☐ Business Travel
    ☐ Online Reservations

None
    ☐ None of the Above

☐ For a Client
☐ For a Different Organization
      in Your Company

[ Cancel ]  [ Invite Team Members> ]

Site Type
  Revision
    ☐ New version of Existing Site
    ☐ New Section or Feature of an
        Existing Site
    ☐ Brand New Site

Domain
    ☐ Internet
    ☐ Intranet
    ☐ Extranet

Bandwidth
    ☐ 28.8 kbps Modem
    ☐ 56 kbps Modem
    ☐ ISDN Modem
    ☐ ADSL
    ☐ Cable Modem
    ☐ T1 or Greater

Security
    ☐ No Security
    ☐ Minimal Security (password protection)
    ☐ Medium Security (password and SSL encryption)
    ☐ High Security (password, SSL, and digital
        certificates)
    ☐ Very High Security (virtual private network)

Development
    ☐ In-house
    ☐ With an Outside firm

FIG._ 6D

**NetRaker
Research Setup**

Help  Support  Sign-out my home > NetRaker Intelligence Center

Research Setup ⇒ | 1. Choose | | 2. Edit | | 3. Invite | | 4. Review |

Step 1a: Choose Research Name

| Your Research Name Here | (Required)

- Use a descriptive name that summarizes the goal of your research

Step 1b: Choose Research Type

| Market Research |

- Choose from a menu of Market Research tools, including:
    - Audience Identification and Lifestyle: learn more about the characteristic s of your audience.
    - eContent and eMessaging/Image: determine your users' impressions of the quality of your site and its content.
    - eCommunications and eMerchandising: determine the effectiveness of your attempts to communicate and sell to your customers.
- Designed by NetRaker's team of professional market researchers.

| Usability Research |

- Conduct a task- based usability test.
- Select from a menu of supporting questionnaires tailored to the characteristics of your site.
- Designed by NetRaker's team of professional usability researchers.

| Custom Research |

- Create your own custom research from scratch.
- Use NetRaker's technology to ask users the questions you want to ask.
- Questionnaire writing experience recommended.

| Cancel |

Instructions

Welcome to the Research Setup Wizard. In the next few screens you will:

1. Choose your research name and research type.
2. Edit the research questions and options.
3. Select or provide a list of research.
4. Review your research.
5. Start your research immediately or save it for later.

FIG. 6E

NetRaker
Research Setup netRaker ™
Help | Support | Sign-out my home > NetRaker Intelligence Center
Research Setup ⇒ | 1. Choose | 2. Edit | 3. Invite | 4. Review

Step 1c: Choose Usability Research for Your Research Name Here

| Research Tool | Est. Duration |
|---|---|
| ☐ Background-Content: Web Development | 5 min. |
| ☐ Task Test: Browse for Info | 30 min. |
| ☐ Post Test Usability Used as a follow-up to a Task Test, this questionnaire asks your users about their impressions of your site after using it. | 15 min |
| ☐ Post Test Value | 5 min. |

| Previous | Cancel | Next |

Instructions
To conduct a task based usability test, make sure the "TaskTest" tool is selected. Then select the supporting tools you want to use.

- All of the tools you select will be merged into a single series of questions for the user.
- On the next screen, you can use the Questionnaire Editor to fill in the tasks you want your users to complete.
- Estimated Duration predicts how long it will take a Research Participant to complete each phase of the research.

FIG._ 6G

**NetRaker
Research Setup**

Help  Support  Sign-out my home > NetRaker Intelligence Center

Research Setup ⇒ | 1. Choose | | 2. Edit | | 3. Invite | | 4. Review |

Step 2a: Edit Questions for Your Research Name Here (optional)

Use NetRaker's Questionnaire Editor to create, modify and delete the questions your research participants will answer and/or the tasks they will complete.

If they are using a task test in your research you must use the Questionnaire Editor to define the tasks your users will complete.

Instructions
Edit your research by customizing questions, your non-disclosure agreement, and participant rewards.

| Edit Questions |

Step 2b: Ask for Demographics

Ask your research participants these questions about age, gender, education, computer experience, and Web experience. These are the same Basic Demographic questions NetRaker uses in our national studies.

☐ Ask demographic questions

Step 2c: Ask for Non-Disclosure Agreement (NDA)

Ask your research participants to agree to non-disclosure of information you present on your site. Either choose one of our default non-disclosures or provide one of your own.

(None)

| Edit DNA | | New DNA |

Step 2d: Offer Reward

Offer your research participants your gratitude. Select from the list below or create your own reward.

(None)

| Edit DNA | | New DNA |

FIG._6H

NetRaker
 my home > NetRaker Intelligence Center
Research Name: Your Research Name Here

Research Setup ⇒ | 1. Choose ✓ | 2. Edit ✓ | 3. Invite | 4. Review |

Step 3a: Choose Maximum Number of Participants

Enter the maximum number of participants you want to participate in this research.

Step 3b: Invite Participants

If you already have a list of research candidates, enter their email addresses here. On most browsers, you can cut and paste the list directly into this box.

Step 3c: Review Invitation Message

Review the message that will be sent to all of the research candidates. You can edit the message if you wish.

| Previous | Cancel | | Next |

Instructions
Complete the setup process by determining who will participate in this research. The research will automatically stop when the maximum number of participants has been reached.

After you have listed your participants and reviewed the invitation message, you can proceed to review your research plan.

FIG._6I

NetRaker
    my home > NetRaker Intelligence Center
Research Name: Your Research Name Here

Help | Support | Sign-out

Research Setup ⟹ | 1. Choose ✓ | 2. Edit ✓ | 3. Invite ✓ | 4. Review |

Max. Participant:

Screening:      No Screen

NDA:

Reward:

Recorder:      Audio On

Invitees:

Invitation Message:

Instructions
Review the settings for this research. If you want to change any settings, use the "Previous" button to go back to earlier steps and make changes.

If you are satisfied with the research plan, you can start it right away or save it to start at a later time.

You can make changes to these settings later before starting the research.

| Previous | Cancel | Start Now | Save and Start Later |

Fig._6J

AUTOMATED RESEARCH TOOL

The present invention relates generally to computer systems and more particularly to methods and apparatus for gathering research data for a website.

BACKGROUND OF THE INVENTION

Th explosion of the Internet has provided new business opportunities and markets for a broad spectrum of industries. The Internet provides unprecedented opportunities for businesses to reach customers by providing a website that describes a business's products or services. The appeal of the website often can influence purchase decisions by a consumer. The appeal is a measure of both the subject matter, the method of presentation and other intangible factors. If a website includes content that is appealing to a consumer, the consumer is more likely to purchase the services or products advertised. Advertising has long been used in other media forms in order to attract purchasers. The web is no different. The success of a product or service on-line is generally measured in sales. However, reasons for closing a sale vary. Some sales: will complete irrespective of the environment. Other customers may have to be convinced that the product or service is both valuable and necessary. The website can be a powerful tool in the persuasion process.

In addition, a website may be used to convey information, separate and apart from a sales environment. Success for an informational website may be measured in terms of the number of users that come to the website and the amount of time they stay. How long a user stays at a website can be influenced by the appeal of the website. Again, the appeal is a measure of both the content and the method of presentation.

In order to measure the appeal of a website, conventional webpage builders have numerous options. In some cases, a web page may include a request for feedback and provide users with an ability to send compliments and, more often, complaints back to the website sponsor. While these means are helpful, the information received may be biased or not representative of the general appeal of the website and therefore of little help to the website sponsor. Alternatively, a user may be asked to participate in a survey. Often, the surveys are long and unfocused. Just as with the feedback information, the information received can be biased or unreliable.

SUMMARY

In one aspect the invention provides a method for automatically gathering research data for a website. The method includes forming-questions in a question set that are a measure of a research metric to be gathered for the website; partitioning the question set into a plurality of subsets of questions, identifying participants to query, and only presenting a subset of questions from the question set to each participant. Responses are gathered from each participant to the questions presented for the research metric and the participants' responses are combined to produce an index of the research metric.

Aspects of the invention can include one or more of the following features. The research data can be selected from usability, product and organizational research. The gathering step can be performed without a permission of a website's sponsor.

The method can further include forming questions in a plurality of question sets that are a measure, respectively, of a plurality of research metrics to be gathered for the website and partitioning each question set into a plurality of subsets of questions. Only a subset of questions for each question set can be presented to each participant. Responses are gathered from each participant to the questions presented for each research metric and the participant's responses can be combined to produce a plurality of indexes, one for each of the research metrics.

The method can further including characterizing the website including determining a site profile and automatically selecting questions from a predefined list of questions directed to the research metric based on the site profile. Participants can be screened to fine tune the research with respect to predefined benchmarks. One or more participant types can be identified, quotas can be set for each participant type to be included in the research and participants can be screened based on the quotas for inclusion in the research.

Participant responses can be recorded when gathering participant research data. The participant responses can be selected from the group of audio, gestural and keystroke responses. A screenshot of a user interface presented to the participant can be captured for one or more of the participant responses. The recorder can be downloaded from the website and invoked when a participant is selected. Responses that are gathered by the recorder can be uploaded to a centralized research site for analysis.

A reward to be given to a participant upon completion of participation can be identified. Research participants can be characterized into one or more types and the reward can be customized for each participant type.

The step of identifying participants can include selecting from visitors at the website including displaying an invitation to a selected visitor. The step of displaying an invitation can include providing a palette of invitations, gathering statistical information each time an invitation is selected from the palette to measure one or more palette metrics and selecting an invitation based on the statistics gathered for the one or more palette metrics.

The method can include storing historical results for the research metric and a representation of the website or portion of the website to which the metric pertains. Upon to detecting a change to the website, new responses from participants to the questions presented for the research metric can be gathered. The participant's responses can be combined to produce an index of the research metric for the changed website. The indexes for the website can be compared against the changed website to measure a change of the research metric between the two.

Aspects of the invention may include one or more of the following advantages. Research can be automatically gathered from a website. The research can include website marketing, usability, product and organizational research. The research can be performed with or without the permission of the website sponsor. A tool is provided for customizing research for the usability of a website. Research participants can be screened to fine tune the research with respect to certain benchmarks. Quotas for one or more participant types can be easily defined to allow for precise measurement across a broad spectrum of participants. Research questions can be customized or questions can be used from predefined templates. Predefined templates are provided that target particular website profile types. The length of the research can be minimized to ensure the highest quality results. Question sets can be partitioned and each participant can be queried with a subset of the research questions. The questions can be summarized by a single index number, or questions can be summarized in plural indices. User responses and interaction including audio and video can be recorded and uploaded for analysis to allow for easy resolution of usability problems. Research rewards can be customized along with mechanisms for selecting participants. A palette of pop-up menus can be used to invite participants. The success of individual invitation means can be measured and used as a selection criterion in deciding which invitation form to use for future solicitations. Historical results can be retrieved to allow for easy comparison with current usability results. Results can be compared with competitive sites. An intelligence center is provided to allow for the collaboration of plural team members in the research process.

Other advantages and features will be apparent from the following description and claims.

BRIEF DESCRIPTION OF THE DRAWINGS

FIGS. 6a–6j are diagrams of the user interface presented by the website research tool of FIG. 1.

DETAILED DESCRIPTION

Figure 1:
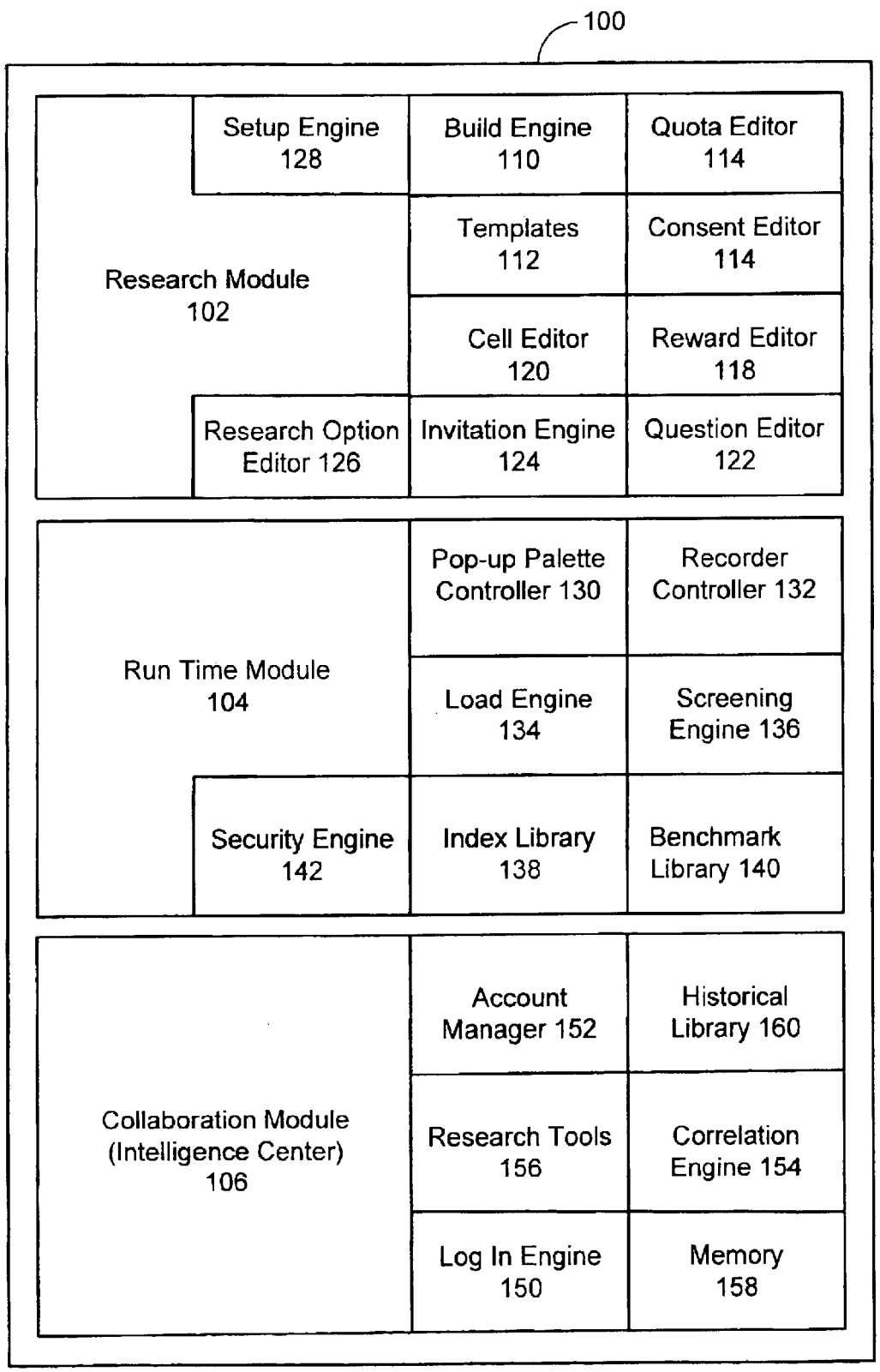
FIG. 1 is a schematic block diagram of a website research tool.

Referring now to FIG. 1, an architecture for a website research tool 100 is shown. The website research tool 100 includes a research module 102, a run-time module 104, and an intelligence center (hereinafter referred to as collaboration module 106).

Research Module

Research module 102 includes a build engine 110, one or more templates 112, quota editor 114, consent editor 116, reward editor 118, cell editor 120, question editor 122, invitation engine 124, research options editor 126 and set-up engine 128.

Build engine 110 is used in constructing a research project. In one implementation, the build engine 110 can be invoked when a customer visits a research service center. The research service center may be implemented in software and provide a website as part of a user interface to support customer research projects. Build engine 110 prompts a user to name a research project and elect from pre-defined research tools or customized research options. Depending on the user selections, various ones of the research module engines or editors are invoked as described below. The process for building a research project is described in greater detail below.

One or more templates 112 can be accessed by build engine 110 in constructing a research project. The selection of a particular template can be driven from customer input provided as part of a site profile. The site profile is described in greater detail below in association with the collaboration module 106.

Quota editor 114, in conjunction with cell editor 120, can be used to tailor the participants selected in a research project. Cell editor 120 can be used to define one or more cells of participants. Each cell defines a target class of participants. A class can be defined based on demographic information or other benchmarks. Quota editor 114 can be used to target the research audience. Quota editor 114 allows a user to set quotas for each cell type in a given research project. Initially, no quotas may be set. Alternatively, quotas can be set based on the information included in the site profile. Quota editor 114 is a tool that can be used to override these default settings so as to allow for the precise targeting of the research. In one implementation, the input received from the customer using quota editor 114 can be used to construct a screening questionnaire. Quota editor 114 can automatically create the screening questionnaire from cell information provided by cell generator 112. The screening questionnaire is a candidate screening mechanism used to identify participants for inclusion in a research project.

Consent editor 116 can be used to elect, select, create or modify various consent forms that may be used in a research project. In one implementation, a non-disclosure agreement can be presented to a participant prior to running a research project. Consent editor 116 can be used to select or modify one or more standard non-disclosure agreements that are provided by the system. In one implementation, a recorder can be invoked to record the responses (mouse moves, keyboard strokes, screen capture and audio and video feedback) of a participant during the course of a research project. Consent editor 116 can be used to select or modify a consent form for the recording processes if elected. Consent editor 116 can also be used to deselect any default consent forms where none are required for the particular research project.

Reward editor 118 can be used to select the particular type of reward, if any, that is to be given to participants upon the completion of a research task. Reward editor 118 can be used to assign different rewards to each class (cell) of participants.

Question editor 122 allows a user to create and edit questions. Alternatively, predefined question lists can be used in building a research project. Question editor 122 can be invoked to create new questions or edit predefined questions. Questions can be edited for content or form. In addition, the form of the answer can be varied.

A research project includes a questionnaire. The questionnaire defines a set of questions or tasks that are to be performed by the participants to the research project. In one implementation, the questions are of the form of index questions and benchmark questions. Index questions gather information specific to a particular site and produce a measurable result, typically of the form of a numeric rating. The term "index," as used herein, refers to the rating assigned by the participants to a particular index category. The rating is measured through the responses received from the participants of the research project. Examples of categories of index questions are usability, site satisfaction, retention, brand value, service, content and community indexes.

Usability is a measure of a web site's ease of use as judged by the site's visitors.

Site satisfaction refers to the overall satisfaction of the website as judged by the site's visitors.

Retention is a measure of the likelihood that a site visitor will perform a predefined action. Example of retention categories include likelihood the visitor will return to the website, use the product, tell friends or associates or purchase a product.

The brand value index category is a measure of the appeal of the website to a visitor. Distinguished from the satisfaction index, the brand value index is more of an assessment as to the promises made, or the marketing and images that are used in the website in marketing the product or service.

The service index is a measure of the satisfaction that the visitor finds as to whether or not the products or services that are being offered will accomplish the stated purpose and whether or not there is a belief that the offerings are in fact valuable.

The content index is a measure of the satisfaction of the visitor to the content presented on the site, that is, the information provided about the product or service.

The community index is a measure of the community impact for a website. Fostering a sense of information and idea sharing as well as the opportunity to develop mutual learning opportunities among a site's visitors and between visitors has been one of the hallmarks of currently successful sites. The community index attempts to measure the impact of the website from this unique perspective.

Benchmark questions gather information about the participant. Benchmarks can be used as screening factors to determine which candidates should be selected to be participants in a particular research project. For example, if the customer is seeking to get feedback for a particular site from people that live in the south, that are over the age of 60, then the responses to the benchmark questions can be used to screen in (or out) participants. In one implementation, the categories of benchmark questions include audience identifier, lifestyle, demographics and computing environment.

Audience identifier questions are used to identify some detail of the audience, other than demographics, that is tied to the likes and dislikes of a particular participant.

Lifestyle questions can be used to determine the background or lifestyle from the perspective of what is important to the particular participant.

Demographics questions can be used to screen for gender, age, country, language, education and other vital visitor statistics.

Computing environment questions can be used to screen for a participant's experience associated with a computer or with a particular computing environment as well as the participant's hardware, software or other computing experience.

The invitation engine 124 can be used to locate participants. Research participants may be provided by a user (e.g., the website owner provides the participants), selected from a list of participants (an approved list) or candidates can be randomly invited to join in the research. Associated with the run-time module is pop-up palette. Various forms of invitations are stored on the pop-up palette. The palette can be automatically initiated at various times to invite visitors to join in a research project. This feature can provide a truly random sampling of the users for inclusion into a research project. Alternatively, research participants may be chosen from a list of research participant/candidate.

A pop-up palette controller 130 in run-time module 104 can measure the success rate associated with responses that are received from a particular pop-up invitation. The success or failure of any individual pop-up invitation can be tracked and an algorithm can be used to self-tune the pop-up palette so that the default pop-up invitation selected for a particular site based on the highest response rate. The pop-up palette controller 130 is discussed in greater detail below.

Research options editor 126 can be invoked to elect various customized research options. One or more variables can be configured by a customer to optimize the data that is to be gathered. In one implementation the variables include: 1) the number of questions in a questionnaire, 2) display options including the form of the questionnaire or the size or form of a pop-up window, 3) the number of questions per page, 4) the font size and layout, 5) the invitation wording, 6) the music or audio in the background, 7) a timer that can be used for measuring how long a user takes to perform a task, 8) graphics associated with the questions, 9) a game or other interesting feature that is presented, and 10) recorder audio/video/event options.

In one implementation, the user interface presented by the run-time module 104 includes a partitioned screen. The format and layout of the screen display can be configured using the research options editor 126. In one implementation, the user interface is configured to include two windows, one for displaying tasking instructions or questions, and a second window for displaying the particular site that is being evaluated.

In one implementation, a recorder is downloaded to a participant prior to commencing research questioning. On the user side, the system provides for multilevel screening and recording of the interaction of the users. The recorder can be configured to record keystrokes, screen progression, audio and video at the participant's site. The recorder can automatically bookmarks recordings. Recording can be initiated upon receipt of a command from the run-time module 104. The recorder also can stop recording and upload, back to the run-time module 104, data retrieved on command (from the run-time module).

Set-up engine 128 downloads any code to the customer's website and prepares invitations as required. In one implementation, a JavaScript code for invoking the run-time module 104 as well as a pop-up palette are downloaded to the customer's website.

In one implementation, all of the customer information for a research project is stored in a site index. The site index includes all of the information required to run a research project including pointers to index questions, benchmark questions and research options. The site index can be stored in memory 158. Alternatively, the site index can be distributed among the memory and other libraries.

Run-Time Module

Run-time module 104 is invoked by a candidate. The candidate can invoke the module in response to an invitation received directly from research module 102 or in response to an invitation that is provided at a customer's website. Run-time module 104 includes a pop-up palette controller 130, recorder controller 132, load engine 134, screening engine 136, index library 138, benchmark library 140 and security engine 142.

Pop-up controller 130 is used to gather information for each successful use of a pop-up invitation. If a candidate is elected to be included as a participant in a research project, pop-up controller 130 records the type of pop-up invitation used to attract the participant. Pop-controller 130 maintains statistical information for each pop-up invitation used in the pop-up palette. In one implementation, the statistical information is used to determine the pop-up palette to be used for a particular website. Alternatively, statistical information can be gathered locally at the customer's website.

Recorder controller 132 is used to prompt action from a recorder located at a participant's computer. Recorder controller 132 can be used to prompt the local recorder to begin recording, stop recording and upload recorded data. Recorder controller 132 retrieves information for recording options from the site index associated with the particular research project.

Load engine 134 can be used to upload and download information during runtime.

Screening engine 136 is used to screen candidates to determine whether or not a particular candidate is qualified to be a participant in a research project. Screening engine 136 is invoked after a candidate responds to an invitation. Screening engine 136 includes a tool for displaying a user interface on a candidates computer. Screening engine 136 checks for any consent requirements and displays consent forms (NDA, Recording consent) using the user interface. When consent is returned (accepted or not required), the screening engine can display a screening questionnaire. The screening questionnaire can be retrieved from the site index stored in memory 158. The screening questionnaire is developed as described above in conjunction with the quota editor 114.

Index library 138 and benchmark library 140 include the question sets for a research project. The site index can include a pointer to particular sets of questions stored in each library. Alternatively, the questions can be stored as part of the site index.

Security engine 142 is operable to ensure the research integrity is maintained. Security engine 142 can prevent various acts of ballot stuffing at a customer site or at a customer's competitor site. A site identifier (ID) can be used to identify the research. The site ID can be encoded to help prevent a general attack. In one implementation, the site ID is a very large number or long string with space between various different ones of the valid site IDs. Security engine 142 can check a referring URL to make sure that the referring URL is coming from a host site that is listed within an index of approved host site referrals. In another implementation, security engine 142 cookies each participant to help prevent ballot stuffing. For example, the participant may be given a cookie that is stored on his machine that can be searched: for when a subsequent ballots are submitted. In addition, each participant's IP address may be recorded to help trace ballot stuffers. Finally, a ballot time may be recorded to help verify that valid balloting occurred. For example, in one implementation, valid ballots can not be cast less than a minute apart.

Intelligence Center

Collaboration module 106 provides a secure environment to share customer intelligence and team management information. It is a place to collaborate design and develop market research and usability research. Collaboration module 106 provides a means for a team to interpret research results and a means to utilize various different research building tools and services as they become available.

Collaboration module 106 includes a log-in engine 150, account manager 152, correlation engine 154, research tools 156, memory 158 and historical library 160.

Log-in engine 150 can be invoked when a customer visits a research service center. The research service center may be implemented in software and provide a website as part of a user interface to support customer research projects. Log-in engine 150 prompts a user to log-in. Users that have an account are presented with a user interface that include information about the account, team members, research modules and research status. An example of the user interface presented to existing account holders is shown in FIG. 6a. In the implementation shown, a team list 600, research module list 602 and customization banner 604 are displayed after log-in. Team list 600 can be edited and E-mail can be easily generated to be passed to the team members. Research module list 602 includes an entry for each research project and status indicator 606 for each project. One or more actions 608 can be invoked for each project. Actions include dry run, run, stop and review results. One entry 610 in research module list 602 is provided for creating a new research project and includes an start new action button. The process for creating a research project is described in greater detail below. Customization banner 604 allows a user to customize the user interface. In one implementation, the user interface is divided into two sides, a left and right side. The left side includes team and account information. The right side includes research project information. Options can include adding information to the "left" side of the user interface or "right" side of the interface.

New Accounts

Initially a customer uses the log-in engine 150 to create an account. Each customer account can include one or more research project. Account information for a customer can be stored in memory 158. The account information includes an identifier for the customer's web site, an e-mail address and can include a collaboration group definition. A customer can use the log-in engine to create a group that can access the research information gathered for the account. Group members can be given different priorities and access rights. In one implementation, two types of group members are defined, team members having full access rights and client stakeholders that can view but not modify research projects and data. At the initial log-in, a customer is prompted to provide site information to be recorded in a site profile.

Associated with each account is a site profile. Log-in engine 150 prompts a customer to fill out a site profile to identify and characterize the customer's website. The site profile can be stored in memory 158. Referring now to FIGS. 6b–d, a user interface presented by log-in engine 150 is shown for building a site profile. A user is prompted for a site name and information to characterize both the content and usage for the website.

In the implementation shown, the site content is characterized according to a content type. The content type can be selected from education, government, computers and Internet, news and media, sports and recreation, health, product information, arts and entertainment, business and finance, home and family, reference, science, shopping, society and culture, travel and other. Each of the individual content types can further include sub-types as is shown. In one implementation, one or more types of content can be indicated.

The usage type describes the intended use of the website. In one implementation, one or more usage selections can be indicated.

Site type indicators can be used to provide details about the website. Site security, domain, bandwidth and development history can all be indicated. The selections of the customer can be used by the system to select questions and templates when constructing a research project.

After the site profile is completed, a customer is prompted to enter the names of the various members that are to be part of the team that will use the account. Team members are invited and given appropriate passwords and account identifier information so as to be able to log-in and access account data.

Returning to FIG. 1, account manager 152 manages existing accounts. Account manager 152 includes an administrator and help functions.

Correlation engine 154 is used to correlate index data and benchmark data received for a customer. Correlation engine 154 can automatically provide statistical information for review by a customer. Correlation engine 154 can be invoked by a customer or other team member using a command from the research module list entry that is to be reviewed. The results can be stored for future reference in historical library 156. Correlation engine 154 produces as an output one or more reports.

The information that is gathered in the index data portions of the research provide a numerical rating or index to describe a participant's satisfaction or rating of a given metric. For example, the rating may be based on a numerical scale that ranges from 0 to 10 with 10 being the highest and 0 being the lowest. If an index is computed, then this index may be presented to the account manager at the time that research is completed. This index can then be updated over time depending on the results from future participants.

In one implementation, each balloter is provided a subset of one or more index question sets as well as one set or more of benchmark questions. Each balloter generates a number rating for a website page in one or more of the index sets. A single number can be used to summarize the usability, retention, etc., for the particular index. In one implementation, the benchmark is a measure of the deviation from an Internet standard and provides a percentage in terms of the deviation for the particular user group. Correlations can be drawn by correlation engine 154 between the benchmark data and the index data in order to provide the customers with more specific information. In addition, correlator engine 154 can be used to provide a longitudinal measure of customer ratings. By a longitudinal customer ratings measurement, we refer to the system's ability to gather information associated with the website over a period of time. Customer ratings can then be measured in a particular group over a particular time. The results can be gathered and built into a database and the database can be updated to provide a strategically sound result.

Various research tools can be invoked by the team members. Examples of tools include bug tracker, competition tester, site tester, performance measurer, tasker, action tracker, search services morale meter, organization tool, product tool and service tool.

Bug tracker can be used to ensure that a website is free from costly and embarrassing bugs. The tracker can be invoked for one time operation or invoked on a regular basis to screen a customer's website.

Competition tester is a tool that can be used to invoke research on a competitors website. A competitor's strengths and weaknesses can be measured and leveraged by the customer using the index data derived for a competitors site. Changes in the competitor's site can be monitored and correlation data derived reflecting changes in the usability of the competitor's site.

Site tester is a tool designed to automatically test a customer's site for common errors. In one implementation, tests are run for resolving domain names (DNS entries), missing pages, missing graphics, poor response and other common errors.

Performance measurer provides diagnostic information for problems associated with performance for a particular site. The tool provides performance measurement diagnostics as well as site screen capture and review features.

Tasker is a tool for performing task based research. Tasker allows the user the ability to set up tasks for a website including the identification of scenarios of entry and task research to see if different scenarios are being satisfied.

Action tracker is used to measure workflow for revisions or other tasks associated with the collaboration services. The tracker can be used to track organizational issues and requests for problems for a particular customer and provides managed workflow for an organization.

Search services provide a comprehensive search option capability including search operators and dictionaries for a customer's website. The search service tool can be inserted as a script in a customer's website. Once inserted, the service runs on a remote server, but provides search results to the website's visitors. The search service delivers search results and queries users as to their satisfaction with the results. The feedback can be used to tune the search engine response. The website operator can use result statistics and performance ratings (feedback) to improve the user's website experience.

Morale meter is used to measure the morale for a team. The morale meter provides a mechanism for team members to report their morale using one or more graphical indicators, so that managers and teammates can assess the morale of the team and take action as appropriate to boost team morale.

Organizational tool provides tools for polling employees of an organization and delivering aggregate team member assessments of company or project progress and organizational efficiencies.

Product tool provides a mechanism for engaging customers in an ongoing dialogue about company products. The tool provides product designers and management better insight into their customers needs and desires and includes feedback on products and areas for improvement.

Service tool provides features similar to the product tool, but is directed to company services.

Operation

1)

Log in

A user first logs in to the home page for the tool as hosted by a server (the research server). The log in engine is invoked and a user interface is displayed that includes an overview page for the account. Thereafter the user can review research results, create new research, run research, modify existing research projects, modify team lists, and add more research tools.

2) Research Creation

Figure 2:
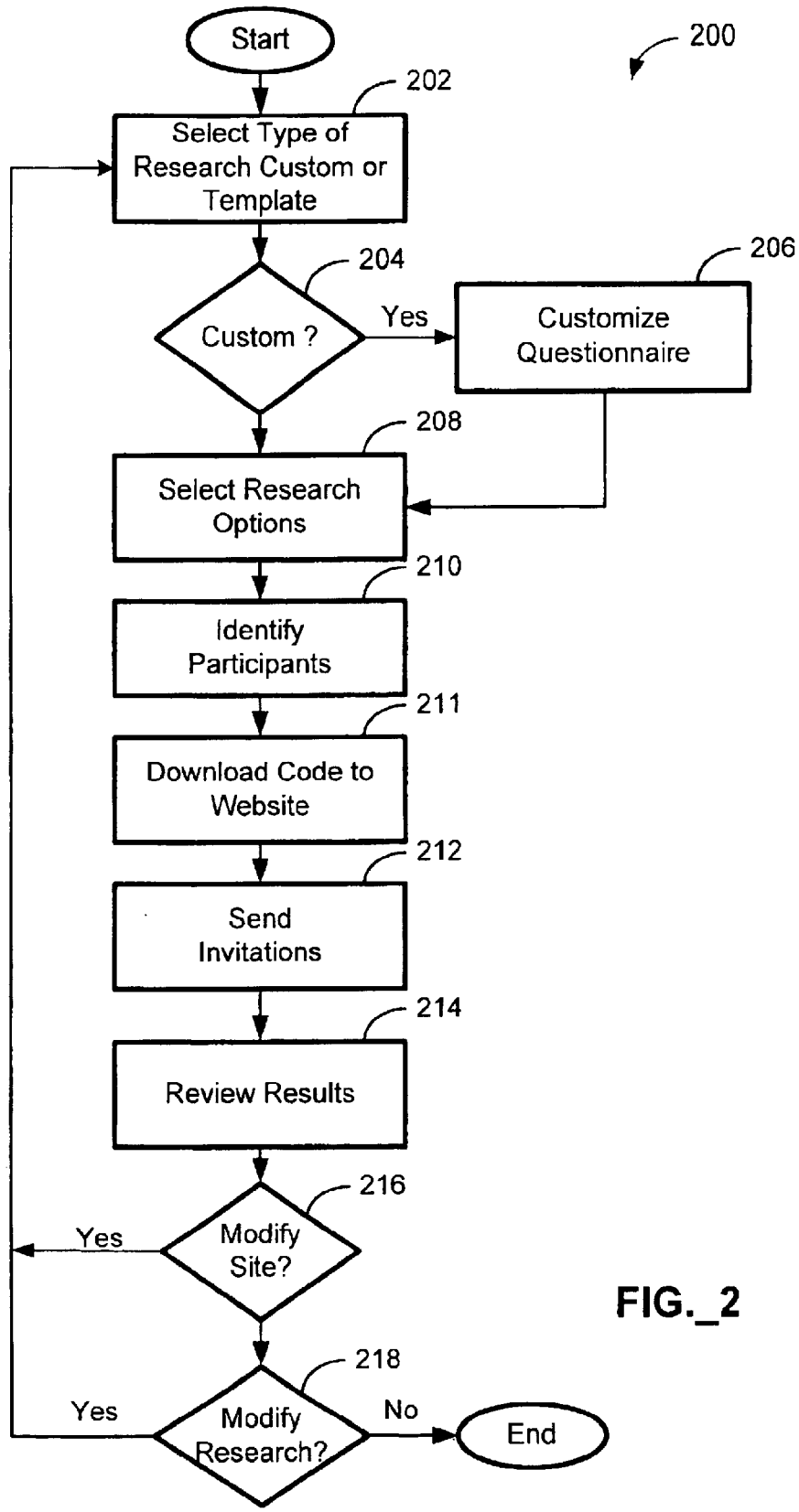
FIG. 2 is a flow diagram of a process for creating research.

A process flow for creating research is shown in FIG. 2. FIGS. 6e–6j are diagrams of the user interface presented by build engine 110 (FIG. 1) when invoking the various steps to build a new research project. Initially, the user is prompted to provide a name for the research project and select a type of research (202). In one implementation, the types of research include template research (market research and usability research) and custom research. Market research can be used to determine more information about the type of audience visiting a website. In one implementation, the market research includes predefined benchmark questions stored as a template. Different templates are defined depending on the site profile information provided by the customer. Usability research allows a customer to create a task based usability test and a supporting questionnaire for a website. In one implementation, the usability research includes predefined index questions stored as a template. Again, different templates are defined depending on the site profile information provided by the customer. Custom research can be elected and include elements of both usability as well as market based considerations.

If the custom research option is elected (204), then a customized questionnaire and or task is created (206). The process for creating a customized questionnaire is described in greater detail below in association with FIG. 3.

After the questionnaire is identified, the user is prompted to select any other research options (208). Options include: 1) the number of questions in a questionnaire, 2) display options including the form of the questionnaire or the size or form of the pop-up window, 3) the number of questions per page, 4) the font size and layout, 5) the invitation wording, 6) the prize or drawing, (e.g. click rewards), 7) the music or audio in the background, 8) a timer, 9) graphics associated with the questions, 10) a game or other interesting feature that is presented, and 11) recorder audio/video/event options.

As described above, a selection can be made to invoke a recorder. In one implementation, audio, a video, screen capture and keystroke capture options can be selected. The audio capture captures the audio comments from the user when performing the research. The keystroke capture captures the actual keystrokes (or other user input) used. Screen capture records user interface information and can be invoked at each user action. A video camera input can record the physical reactions of the participant. Each of these recorded pieces of information is synchronized to the research providing a bookmark for later analysis.

Thereafter, the user is prompted to identify participants for the research (210). The participants can be identified from a candidate list. Alternatively, the participants can be randomly selected using the pop-up palette at the customer's website. The present invention provides a mechanism for providing automated research. The research can be gathered automatically using a token of code that is embedded within a website so that users are prompted at random to provide information about the usability of a particular website.

If necessary, information is downloaded to the website that is to be evaluated (211). The information can include both the pop-up palette and code for invoking the run-time module.

After the candidate selection process in step 210, invitations are sent (212). In one implementation, invitations are sent directly to candidates. Alternatively, a pop-up palette can be randomly invoked to invite candidates that are visiting a website.

Results can be viewed at any time by logging into the intelligence center (214). If the website is modified, then the existing research project can be modified (216). In addition, the existing research project can be modified to gather other data, for example using different quotas or questions (218).

Figure 3:
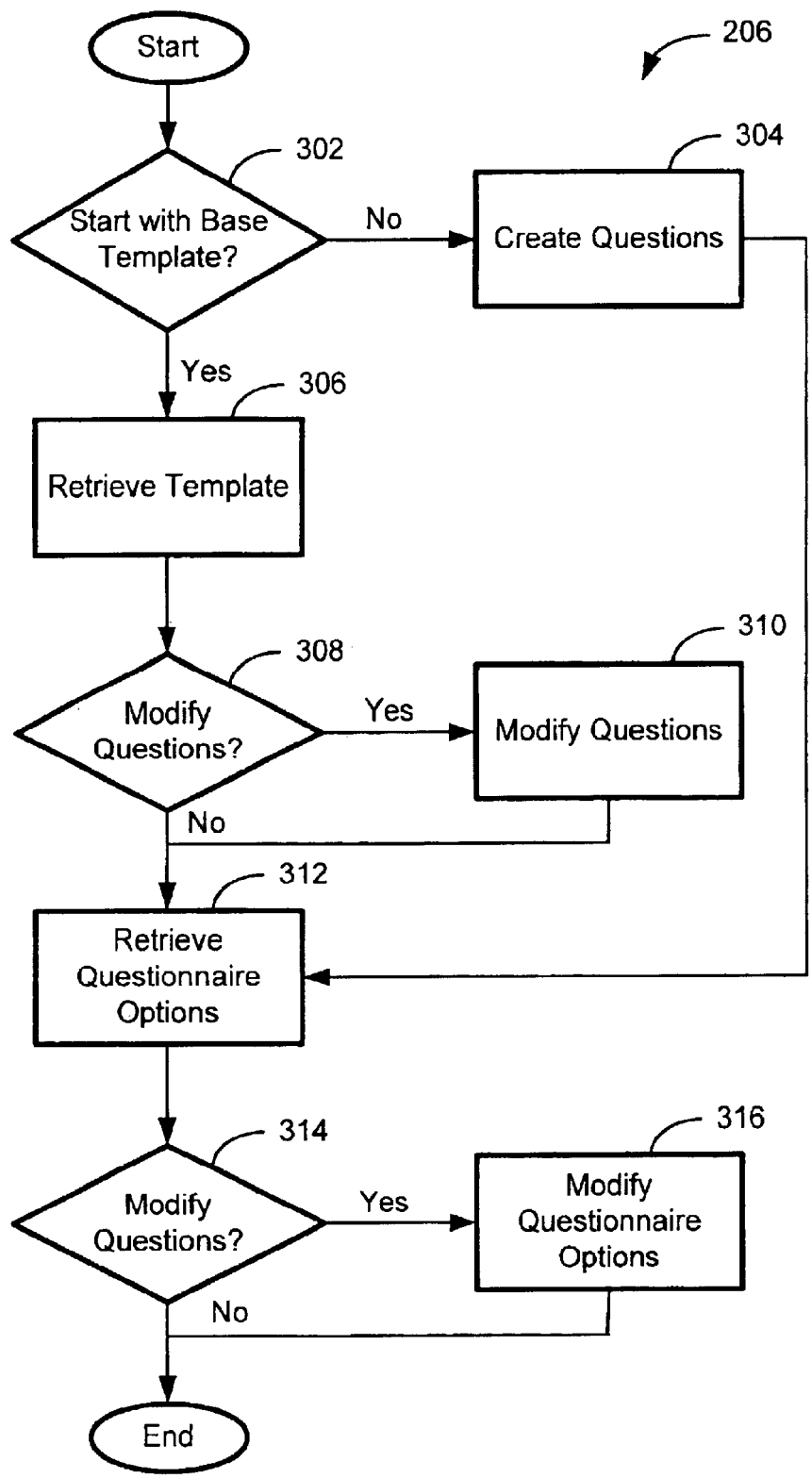
FIG. 3 is a flow diagram of a process for creating a customized questionnaire.

Referring now to FIG. 3, the process for customizing research in step 206 is shown. The user is prompted to determine if a template can be used as a starting block (302). If not, then a custom questionnaire is created (304). More specifically, sets of questions are formed. The question sets can include index and benchmark question sets. In one implementation, subsets of each question set are presented to each participant. More specifically, each set of questions is partitioned into a plurality of subsets. Thereafter, one or more of the subsets can be presented to a given participant. In one implementation, each participant is presented a single subset from each question set. In an alternative implementation, each participant is presented questions from a subset of all of the question sets.

The questionnaire can be of the form of a task and question set. That is, a participant can be directed to perform a particular task at a website. Questions can be presented related to the ease of accomplishing the task as well as checking to ensure the participant is actually attempting the task. When the questions have been created, the process continues at step 312.

If a template is selected, then the template is retrieved (308). One or more templates can be retrieved from the index or benchmark library depending on the information provided as part of the site profile. The user is then prompted to determine if any of the questions in the templates require editing. If so the question editor is invoked and the question lists are modified (310). Thereafter, questionnaire option selections can be retrieved (312). A default selection for each questionnaire option can be provided. The questionnaire options include the numbers of questions presented to each participant, any quota screening information defined by the cell editor and quota editor, rewards options, consent options, etc.

If required (312), the options can be edited by invoking one or more of the editors in the research module (314). Thereafter the process ends.

3) Research Gathering

Figure 4:
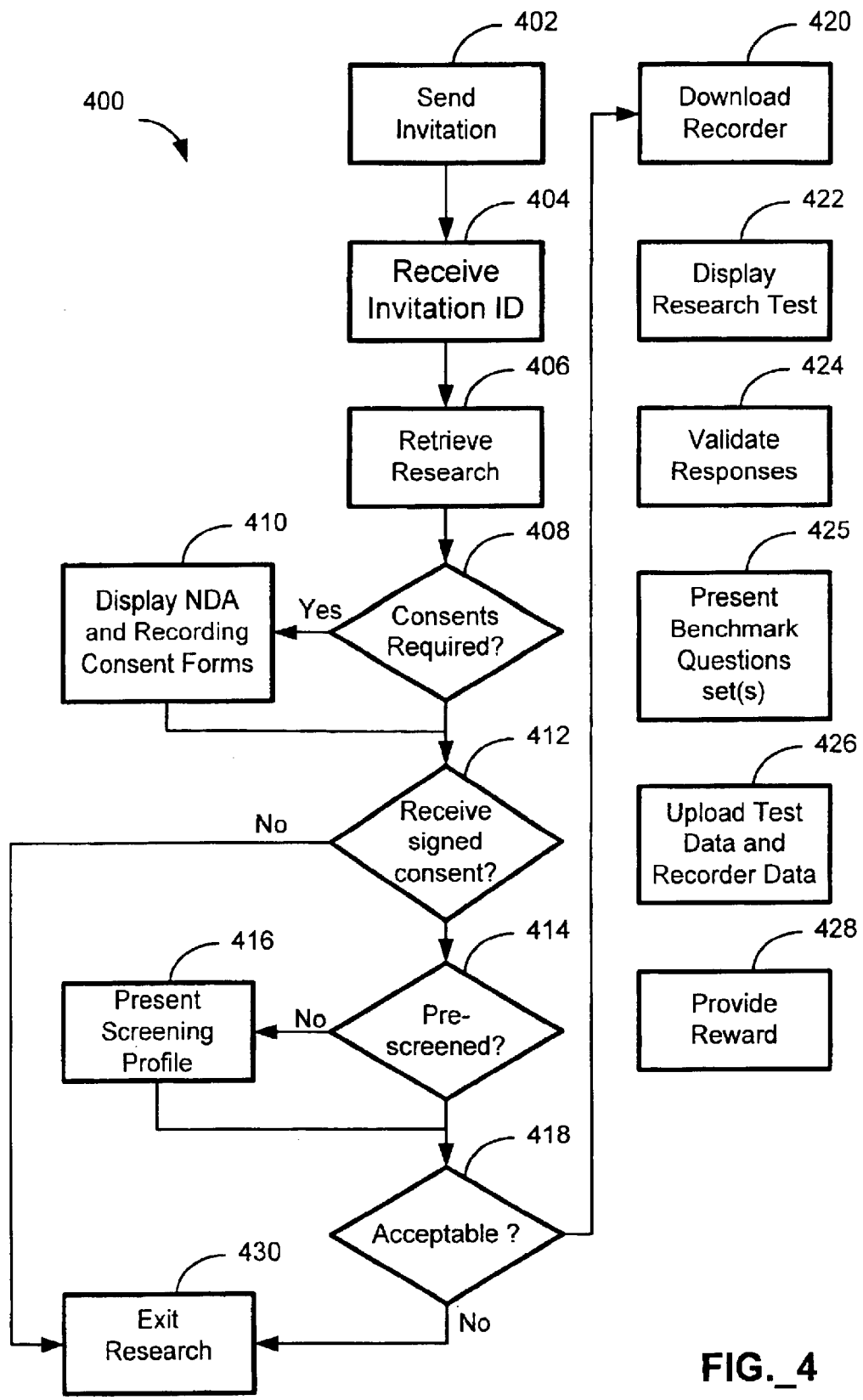
FIG. 4 is a flow diagram of a process for gathering research.

Referring now to FIG. 4, a process 400 executed by the usability tool is shown for gathering research. The process begins with the extension of an invitation to a candidate (402). The invitation can be sent directly to the candidate, or the candidate may be randomly selected from a list or from visitors of a website. The system receives an identifier associated with the research project (404). The identifier can include a participant identifier and a research project identifier. The research details are retrieved from the site index (406). A check is made if consents are required (408). If so, the user is prompted for consent and displayed one or more forms using the user interface (410). If a signed consent is received (digitally signed or acceptance otherwise acknowledged) (412), then a check is made to determine if any prescreening is required of the candidate (414). If no consent is returned, then the candidate is not selected to participate and the research gathering terminates for this candidate (430).

If pre-screening is required, then a screening questionnaire is retrieved and presented to the candidate (416). The pre-screen results are evaluated (if any) (418). As described above, the pre-screening can be used as a quota to target certain cells for research. The screening parameters can be based on demographics or other relevant screening criteria selected by the customer. If the candidate does not pass then the candidate is not selected to participate and the research gathering terminates for this candidate (430).

If the candidate passes the pre-screen, then a recorder can be optionally downloaded (420). Thereafter, the research questions can be displayed (422). In one implementation, a participant is given a subset of a questions to answer in an index set. Alternatively, the participant can be given a subset of the questions in each index set to answer. After the participant has completed the question set(s), the research answers are validated (424). In one implementation, questions are provided as part of the research that have known answers. The insertion of these validating questions assures that participants are actually completing the tasks presented. If the validating questions are not answered correctly, then the research gathering may end or the participant may be prompted to repeat portions of the research in order to gain their reward or the data gathered from this particular participant can be flagged to indicate the validating questions were not answered correctly. In one implementation, at any time, a participant can terminate the research gathering process and thereby forfeit his/her reward.

A benchmark question set(s) is retrieved and presented to the participant (425). In one implementation, a participant is provided a subset of questions from each benchmark type. The test data and any recorded information is uploaded to the run-time module (426). Thereafter, the participant is provided with the identified reward (428) and the process ends.

4) Participant Process

Figure 5:
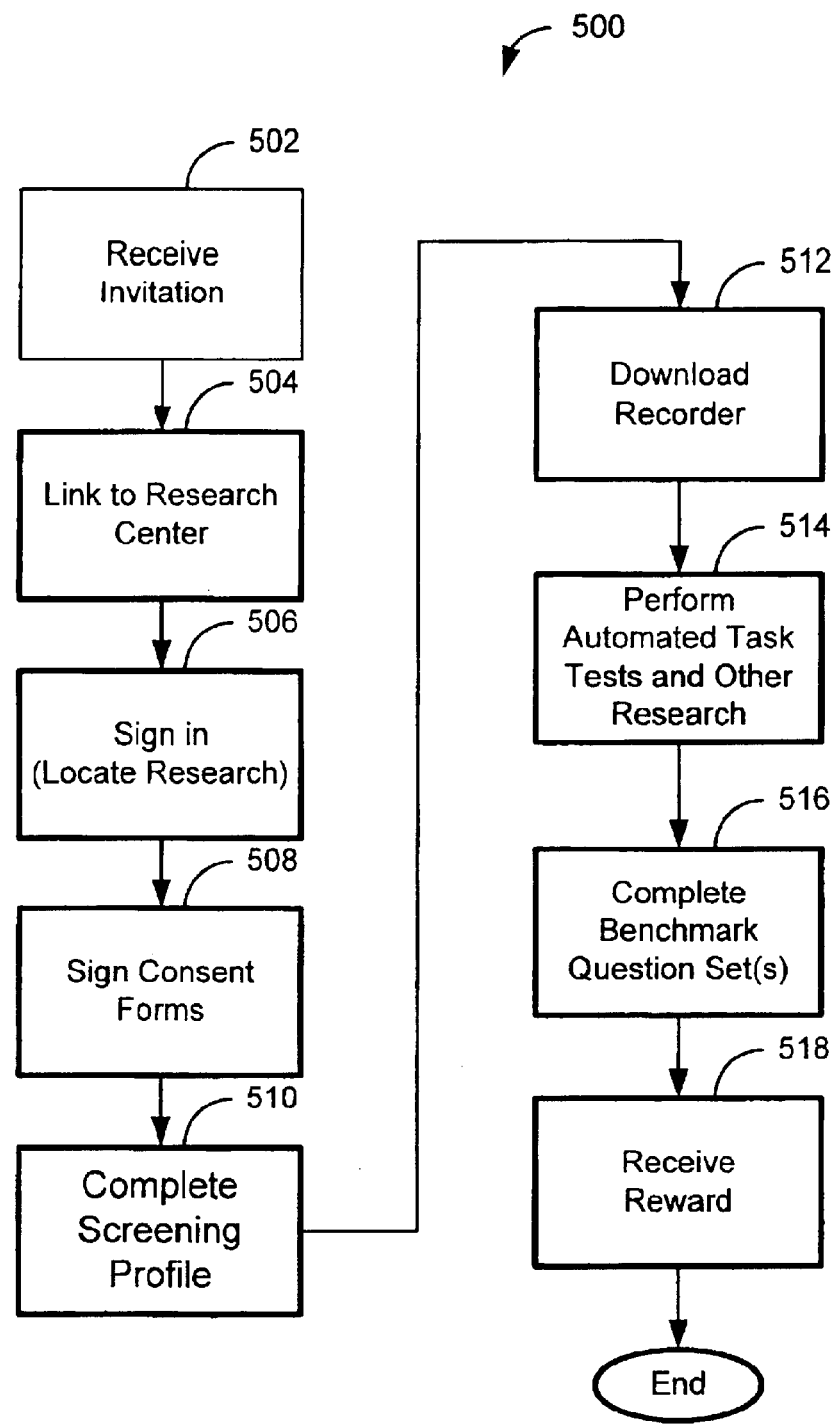
FIG. 5 is a flow diagram of a process, from the perspective of the participant, for gathering research.

Referring now to FIG. 5, a process 500 from the perspective of the participant is shown for gathering research. The process begins with the receipt of an invitation (502). The invitation can be sent directly to the candidate, or can be displayed on a website (where candidates are selected from website visitors). The candidate links to the research center (504). In one implementation, the link is provided as part of the invitation and can be of the form of a URL. The candidate signs in providing a research identifier (506). The candidate signs the appropriate consent forms (508). If no consent is returned, then the candidate is not selected to participate and the research gathering terminates for this candidate.

If pre-screening is required, then a screening questionnaire is retrieved and presented to the candidate. The candidate completes the pre-screen form (510). If the information is acceptable, the candidate will be selected as a participant. The participant can download information as required from the research center, e.g. a recorder (512).

Thereafter, the participant completes the research questions and tasks (if any) (514). In one implementation, a participant is given a subset of a questions to answer in an index set. Alternatively, the participant can be given a subset of the questions in each index set to answer. After the participant has completed the question set(s), the participant completes a benchmark question set(s) (516). In one implementation, a participant is provided a subset of questions from each benchmark type. The test data and any recorded information is uploaded to the run-time module. Thereafter, the participant collects the identified reward (518) and the process ends.

Alternative Implementations

Research may be gathered about a customer's own website or alternatively, may be gathered about another website. When gathering information about one's own website, e.g., a customer will sign up with the research tool and construct a research project. Once the research is constructed a piece of code may be inserted into the content that is displayed on a page, either in a particular section or in subsections of a page. The code piece links to the run-time module that is operated by the research server 100 (FIG. 1) and accesses a particular research project task. The index points to an application or engine which runs on the server to invoke a particular survey index for the particular site. In a second method of operation, the same customer rating research can be run against a competitor's website. Customer rating information can be retrieved for the competitor's site by doing the same kinds of screening both based on index as well as benchmarks. In the second method, the particular site is identified and participants can be selected from the visitors to the customer's website or by other means. For example, a participant may be located at a customer's website and then, there afterwards, may be asked questions about a second or different site. A pop-up menu may be used at the site location to query a user as to whether or not a user may desire to be a participant in the study.

The present invention has been described in terms of specific embodiments, which are illustrative of the invention and not to be construed as limiting. Other embodiments are within the scope of the following claims.

What is claimed:

1. A method for gathering research data comprising:

identifying a target website about which research data will be gathered; characterizing the target website including determining a site profile, the site profile including information for characterizing the target website content and usage;

automatically selecting questions from a predefined list of questions directed to a research metric based on the site profile;

said selecting selects n questions;

partitioning the question set into a plurality of m subsets of questions where a subset m of questions includes $r_i$ questions and where $$n=\Sigma^m_{i=1} r_i;$$

identifying k participants to query;

presenting one or more subsets of questions from the question set to at least one of the identified participants without presenting all of the n questions to all of the k participants and without presenting the same questions to each participant, the presenting step including gathering responses from each participant to their respective subset(s) of questions presented for the research metric coincident with a navigation of the target website by a given participant; and combining the participants' responses to produce an index of the research metric;

the step of characterizing the target website further includes determining a task to be performed by a participant while navigating the target website;

the step of selecting one or more subsets of questions includes selecting questions relevant to the task; and the step of presenting one or more subsets of questions from the question set to at least one of the identified participants includes presenting the one or more subsets of questions to a participant coincident with the navigation of the target website.

2. The research method of claim 1 wherein the research data can be selected from usability, product and organizational research concerning the target website.

3. The research method of claim 1 further including forming questions in a plurality of question sets that are a measure, respectively, of a plurality of research metrics to be gathered for the target website; and partitioning each question set into a plurality of subsets of questions.

4. The research method of claim 3 further including only presenting a subset of questions for each question set to each participant including gathering responses from each participant to the questions presented for each research metric; and combining the participant's responses to produce a plurality of indexes, one for each of the research metrics.

5. The research method of claim 3 further including only presenting a subset of questions for one or more question sets to each participant including gathering responses from each participant to the questions presented for each research metric; and combining the participant's responses to produce a plurality of indexes, one for each of the research metrics.

6. The research method of claim 1 further including identifying k participants to query includes selecting participants from among visitors to the target website including soliciting participants using pop-up invitations and screening participants to fine tune the research with respect to predefined benchmarks and wherein the step of soliciting participants includes providing a pop-up controller operable to determine an effectivity of a given pop-up invitation based in part of responses received from participants presented a given pop-up invitation.

7. The research method of claim 6 further including identifying one or more participant types;

setting quotas for each participant type to be included in the research; and screening participants based on the quotas for inclusion in the research.

8. The research method of claim 6 further where the step of identifying participants includes selecting from visitors at the target website including displaying an invitation to a selected visitor.

9. The research method of claim 8 where the step of displaying an invitation includes providing a palette of invitations;

gathering statistical information each time an invitation is selected from the palette to measure one or more palette metrics; and selecting an invitation based on the statistics gathered for the one or more palette metrics.

10. The research method of claim 1 further including recording participant responses when gathering participant research data including participant behavior information describing how the participant interacted with the target website during navigation of the target website while performing a predetermined task, the participant behavior information including screen capture information for screens presented to the user while performing the predetermined task.

11. The research method of claim 10 further wherein the participant responses are selected from the group of audio, gestural and keystroke responses.

12. The research method of claim 11 further including capturing a screenshot of a user interface presented to the participant from the target website and relating to one or more of the participant responses.

13. The research method of claim 11 further including downloading a recorder to the target website;

invoking the recorder when a participant navigates the target website; and uploading responses gathered by the recorder to a centralized research site for analysis.

14. The research method of claim 1 further including incentivizing a candidate to become a participant including identifying a reward to be given to a participant upon completion of participation.

15. The research method of claim 14 wherein the step of identifying a target website includes selecting a website of a competitor as the target website.

16. The research method of claim 1 further including storing historical results for the research metric and a representation of the target website or portion of the target website to which the metric pertains;

recognizing that the target website has been updated;

gathering new responses from participants to the questions presented for the research metric coincident with the participant's navigation of the updated target website;

combining the participant's responses to produce an index of the research metric for the updated target website; and comparing the indexes for the target website against the target website to measure a change of the research metric between the two.

17. An apparatus for gathering research data comprising:

a research module operable to identifying a target website about which research data will be gathered, characterizing the target website including determining a site profile, the site profile including information for characterizing the target website content and usage, automatically select questions from a predefined list of questions directed to a research metric based on the site profile including selecting n questions, and partitioning the question set into a plurality of m subsets of questions where a subset of m questions includes $r_i$ questions and where $n=\Sigma^{m}_{i=1} r_i$;

identifying k participants to query;

a runtime engine operable to only present one or more: subsets of questions from the question set to at least one of the identified participants without presenting all of the n questions to all of the k participants and without presenting the same questions to each participant, gather responses from each participant to their respective question subsets presented for the research metric coincident with a navigation of the target website by a given participant, and combine the participants' responses to produce an index of the research metric;

wherein the research module includes a setup engine operable to characterize the target website including determine a site profile and a task to be performed by a participant while navigating the target website; and a build tool operable to automatically select questions from a predefined list of questions directed to the research metric based on the site profile including selecting questions relevant to the task and present the one or more subsets of questions to a participant coincident with the navigation of the target website while performing the predetermined task.

18. The apparatus of claim 17 wherein the research data can be selected from usability, product and organizational research concerning the target website.

19. The apparatus of claim 17 wherein the research module includes a question editor operable to form questions in a plurality of question sets that are a measure, respectively, of a plurality of research metrics to be gathered for the target website; and partition each question set into a plurality of subsets of questions.

20. The apparatus of claim 19 wherein the runtime engine is operable to only present a subset of questions for each question set to each participant;

gather responses from each participant to the questions presented for each research metric; and combine the participant's responses to produce a plurality of indexes, one for each of the research metrics.

21. The apparatus of claim 19 wherein the runtime engine is operable to only present a subset of questions for one or more question sets to each participant;

gather responses from each participant to the questions presented for each research metric coincident with the navigation of the target website by a given participant; and combine the participant's responses to produce a plurality of indexes, one for each of the research metrics.

22. The apparatus of claim 17 wherein the research module includes a pop up controller for producing and monitoring an effectivity of pop-up invitations based in part on responses received from participants presented a given pop-up invitation and a quota editor operable to determine a screening criteria for candidates based on user input and wherein the runtime engine includes a screening engine operable to screen participants to fine tune the research with respect to predefined benchmarks.

23. The apparatus of claim 22 wherein the research module includes
- cell editor operable to identify one or more participant types;
- a quota editor operable to set quotas for each participant type to be included in the research; and
- wherein the runtime engine includes
  - a screening engine operable to screen participants based on the quotas for inclusion in the research.

24. The apparatus of claim 17 wherein the runtime engine includes a recorder controller operable to record participant responses when gathering participant research data as the participant navigates the target website while performing a predetermined task, the participant behavior information including screen capture information for screens presented to the user while performing the predetermined task.

25. The apparatus of claim 24 wherein the participant responses are selected from the group of audio, gestural and keystroke responses captured as the participant navigates the target website.

26. The apparatus of claim 24 where the recorder controller is operable to capture a screenshot of a user interface from the target website and presented to the participant during navigation of the target website and related to one or more of the participant responses.

27. The apparatus of claim 24 wherein the runtime engine further includes
- a load engine operable to download a recorder to the website and upload behavioral responses gathered by the recorder during navigation of the target website by a given participant to a centralized research site for analysis;
- and wherein the recorder controller is operable to invoke the recorder when a participant is selected from whom responses are to be gathered.

28. The apparatus of claim 17 wherein the research module further includes a reward editor operable to incentivizing a candidate to become a participant including identifying a reward to be given to a participant upon completion of participation.

29. The apparatus of claim 28 wherein the target website is a website of a competitor.

30. The apparatus of claim 17 wherein the research module includes an invitation engine operable to identify participants including selecting from visitors at the target website including displaying an invitation to a selected visitor.

31. The apparatus of claim 30 where the runtime engine further includes a pop-up palette controller operable to
- provide a palette of invitations;
- gather statistical information each time an invitation is selected from the palette to measure one or more palette metrics; and
- select an invitation to be displayed to a selected visitor based on the statistics gathered for the one or more palette metrics.

32. The apparatus of claim 17 further including a collaboration module operable to
- store historical results for the research metric and a representation of the target website or portion of the target website to which the metric pertains;
- invoke the gathering of new responses from participants to the questions presented at a predetermined time when the target website has been modified, where the runtime engine is operable to combine the participant's responses to produce an index of the research metric for the modified website; and
- compare the indexes for the website against the modified website to measure a change of the research metric between the two.

* * * * *